United States Patent [19]

Snoy

[11] 4,275,607
[45] Jun. 30, 1981

[54] POWER TRANSMISSION HAVING POWER TAKE-OFF SHAFT AND FLUID CONTROL MEANS THEREFOR

[75] Inventor: Joseph B. Snoy, Rockford, Ill.

[73] Assignee: Twin Disc, Incorporated, Racine, Wis.

[21] Appl. No.: 52,801

[22] Filed: Jun. 28, 1979

[51] Int. Cl.³ .................... F16H 37/00; F16D 67/04; F16D 13/74
[52] U.S. Cl. .................... 74/15.63; 192/18 A; 192/113 B
[58] Field of Search .................... 74/15.6, 15.63, 15.8, 74/15.82; 192/13 A, 13 R, 12 C, 15, 18 A, 113 B; 137/625.69

[56] References Cited

U.S. PATENT DOCUMENTS

| | | | |
|---|---|---|---|
| 3,137,311 | 6/1964 | Rohweder et al. | 192/13 R X |
| 3,139,908 | 7/1964 | Strader | 137/625.69 X |
| 3,209,872 | 10/1965 | Moyer et al. | 192/13 R |
| 3,438,399 | 4/1969 | Barnes et al. | 137/625.69 |
| 3,540,556 | 11/1970 | Snoy | 192/4 |
| 3,638,773 | 2/1972 | Lewis et al. | 192/18 A |
| 3,805,931 | 4/1974 | Portmann | 192/12 C X |
| 3,971,461 | 7/1976 | Conroy et al. | 192/12 C X |
| 4,031,762 | 6/1977 | Shellberg | 74/15.63 |
| 4,083,382 | 4/1978 | Khatti et al. | 192/13 R X |

Primary Examiner—Allan D. Herrmann
Attorney, Agent, or Firm—James E. Nilles

[57] ABSTRACT

A power transmission for tractors or the like and having change speed gear mechanism and also having a power take-off shaft for driving auxiliary equipment. A hydraulically actuated clutch is utilized in the transmission for selectively engaging various gear ratios. A hydraulically actuated brake is provided for disconnecting the drive shafts and locking the power take-off to the transmission housing. Operating control valve means are provided for controlling the power take-off brake and a hydraulic detent is provided for the valve. The power take-off shaft is controlled by a modulatable clutch of the duplex type which enables the operator to modulate the speed of the power take-off shift and automatically insures that the power take-off shaft is locked and the power take-off brake is disengaged. The control valve for the power take-off brake includes a hydraulic detent that can lock the operator shifted control valve in the clutch operative position.

6 Claims, 5 Drawing Figures

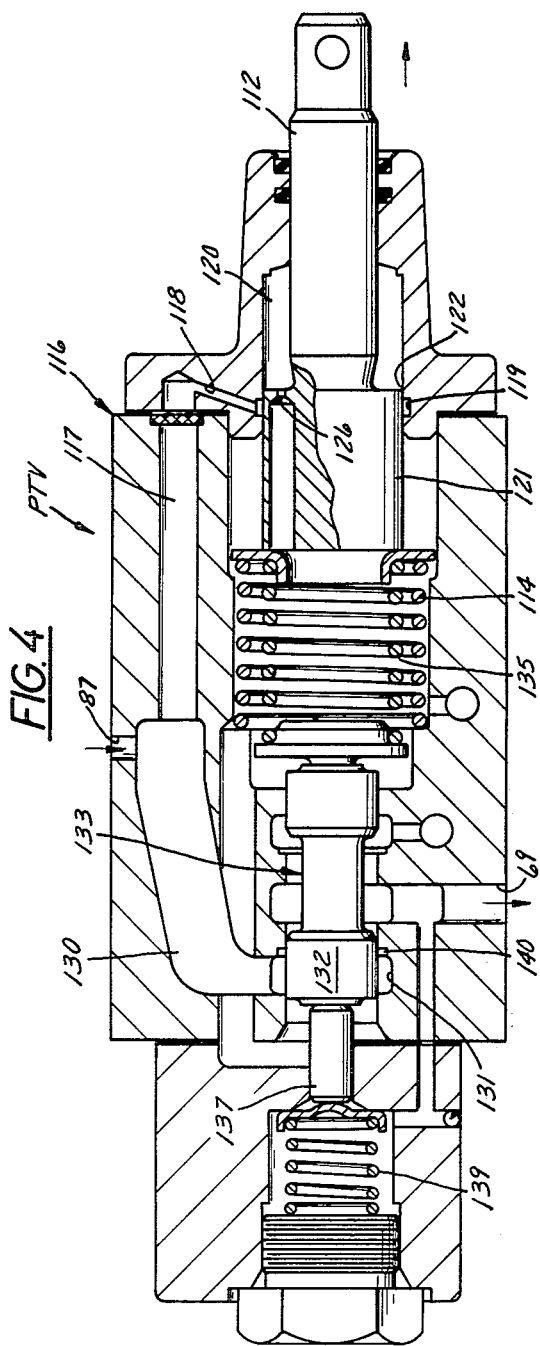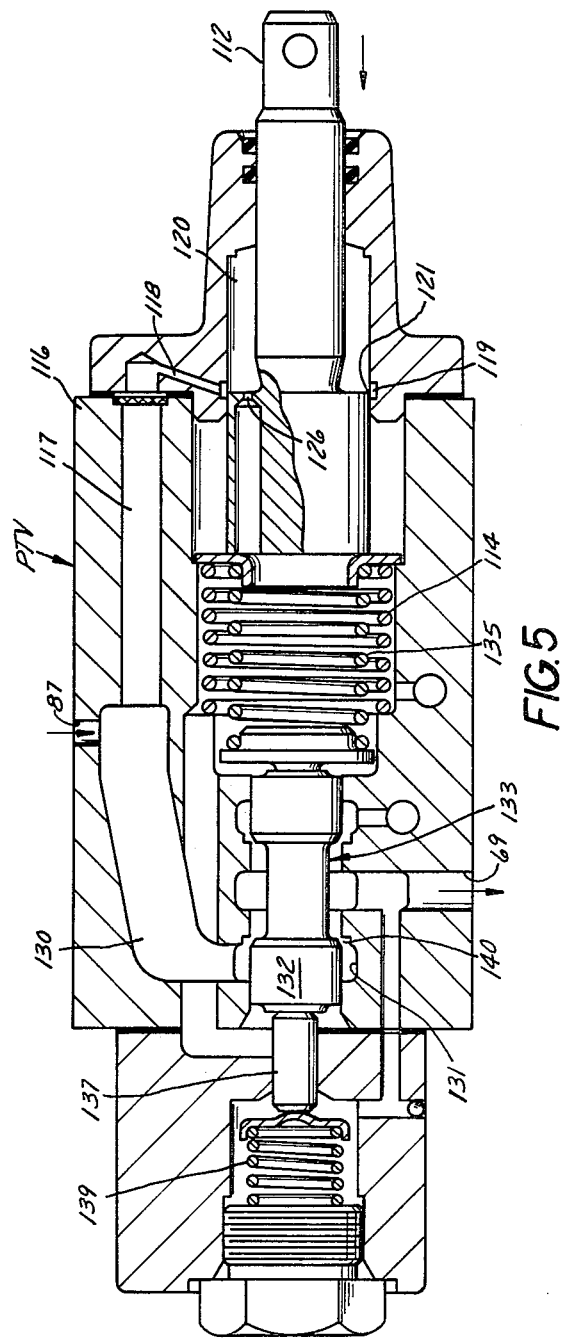

POWER TRANSMISSION HAVING POWER TAKE-OFF SHAFT AND FLUID CONTROL MEANS THEREFOR

BACKGROUND OF THE INVENTION

The present invention pertains to change speed gear mechanisms of the type that find particular utility in driving agricultural tractors or the like. These tractors should preferably be able to be inched along at lower speed and otherwise have a wide range of speed ratios. These tractors also have a power take-off shaft for driving auxiliary machinery and the inadvertent operation of these power take-off shafts or the inability to modulate the speed thereof has resulted in shortcomings of prior art transmissions of this general character.

SUMMARY OF THE PRESENT INVENTION

The present invention provides a change of speed gear transmission that is capable of providing an agricultural tractor or the like with the ability to be inched along at lower speeds and which tractor also has a considerable speed range. More specifically, the transmission has an output shaft for propelling the tractor and which output is controlled by a low range output master clutch of the modulated, friction plate type. The clutch is controlled by a master clutch control valve enabling the operator to control the capacity of the master clutch and inch the tractor along in lower gear.

The invention also contemplates a power take-off shaft for driving implements or machinery attached to a tractor, which shaft is controlled by a modulatable brake which enables the operator to modulate the speed of the power take-off shaft and furthermore automatically insures that the power take-off shaft is locked when the power take-off clutch is disengaged.

Another aspect of the invention provides a transmission of the above type in which the power take-off valve for the power take-off brake can be easily controlled by the operator and includes a hydraulic detent that can lock the operator shifted control valve in the brake operative position.

These and other objects and advantages of the present invention will appear hereinafter as this disclosure progresses, reference being had to the accompanying drawings.

THE DRAWINGS

FIG. 4 is an enlarged, sectional view of the power take-off valve which is also shown in FIGS. 2 and 3, and showing the stem unlocked;

FIG. 5 is a view similar to FIG. 4, but showing the hydraulic detent in the locked position, with the valve stem locked in the inner, pressure increasing position.

DESCRIPTION OF A PREFERRED EMBODIMENT

Figure 1:
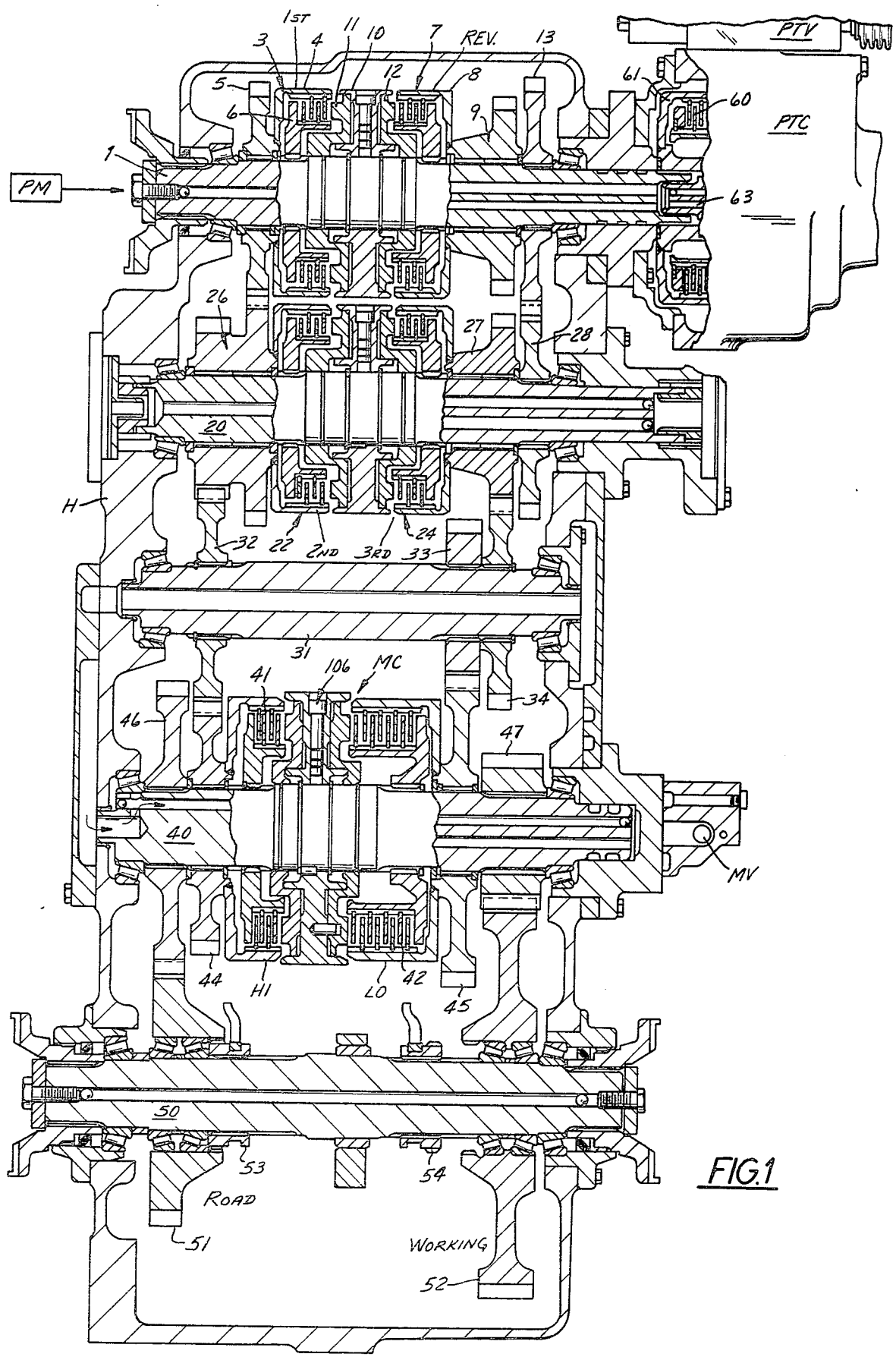
FIG. 1 is a longitudinal sectional view through a transmission embodying the present invention.

The present invention relates to a transmission and control therefor of the type which finds particular utility in agricultural tractors having a power take-off shaft for driving implements or other attached machinery.

The invention permits such a vehicle to be inched along in its travel in the lowest gear and provides a total of twelve closely spaced working speeds, as well as reverse.

The transmission (FIG. 1) has three sets of hydraulically actuated duplex clutches for selectively engaging various gear combinations to provide twelve forward speeds and two reverse speeds. The duplex clutches to be referred to are conventional and transmissions of this general character are shown and described in patents which have been assigned to an assignee common with the present invention, namely, U.S. Pat. No. 4,090,414 issued May 23, 1978 to White; U.S. Pat. No. 3,540,556 issued Nov. 17, 1970 to Snoy et al; U.S. Pat. No. 3,425,293 issued Feb. 4, 1969 to Krawczyk et al. Therefore, it is not believed to be either necessary or desirable to explain the transmission in detail, but reference may be had to those patents if such is desired.

It is believed sufficient to say, for purposes of this disclosure, that the upper or input section consists of a power input shaft 1, suitably journalled in housing H, driven by a prime mover PM, such as an internal combustion engine, the shaft 1 having a duplex clutch assembly mounted thereon which includes a hydraulically actuated, friction plate type clutch 3, the drum 4 of which is fixed as by welding to a gear 5. The clutch 3 also includes the hub 6 which is splined to the shaft 1. The other clutch 7 is similarly constructed and its drum 8 is connected by welding to the gear 9. Both clutches have a common piston assembly housing 10 in which the respective pistons 11 and 12 are mounted to form expansible fluid chambers with the housing to thereby selectively actuate either clutch 3 or 7 and consequently cause rotation of their respective gears 5 or 9. An input gear 13 is splined to shaft 1.

The change speed gear mechanism also includes a shaft 20 also suitably journalled within the housing H of the transmission and similar clutches 22 and 24 are mounted on shaft 20. These clutches are also of the hydraulically actuated friction plate type and are similar in structure and operation to the previously mentioned clutches 3 and 7. The drum of clutch 22 is secured by welding to the compound gear 26 while the drum of clutch 24 is welded to gear 27 and drives the gear when the clutch 24 is engaged in the known manner. An input driven gear 28 is splined to shaft 20, and gears 13 and 28 are meshed together. Gear 5 of the input section is in constant mesh with one of the gears of compound gear 26 as clearly shown. The transmission has a shaft 31 having gears 32, 33, and 34 splined thereto for rotation therewith, gear 32 meshing with the compound gear 26, while gear 34 meshes with gear 27.

The change speed gear mechanism includes a shaft 40 having an output master clutch MC comprising hydraulically actuated friction plate type clutches 41 and 42 mounted thereon. The clutch 41 constitutes the high range clutch while the clutch 42 constitutes a low range clutch. Clutch 41 is fixed to gear 44 while clutch 42 is fixed to gear 45 and gears 46 and 47 are splined to shaft 40.

The change speed gear mechanism also includes a power output shaft 50 suitably journalled in the housing and gears 51 and 52 are journalled on and selectively connectible to the shaft 50 by their respective shifter gears 53 and 54. Gear 51 is a "road" gear and is in constant mesh with gear 46, while gear 52 is a "working" gear and is in constant mesh with gear 47.

The master clutch MC may be of the type shown in my U.S. patent application Ser. No. 8347 filed Feb. 1, 1979 (Group Unit 352), which has a centrifugally operated actuatable control valve for controlling the amount of clutch modulation or engagement so that the capacity of the clutch remains substantially the same at all centrifugal speeds.

Master clutch control valve MV (to be later referred to in greater detail) is associated with the master clutch MC and controls its output.

With the above gear mechanism, a combination of twelve closely working speeds forward are provided with accommodate all agricultural requirements.

The clutches and gears shown in FIG. 1 are selectively actuated in various combinations by solenoid operated range selector valves (FIG. 3) which have been labelled to show the gear speed ranges which they initiate, as will appear.

The above arrangement provides an output shaft 50 which drives the wheels (not shown) of the tractor, the output of which is controlled by the master clutch MC. The power take-off clutch PTC fixed to and driven by shaft 1 is under the control of the operator by means of its hydraulic valve PTV.

Figure 2:
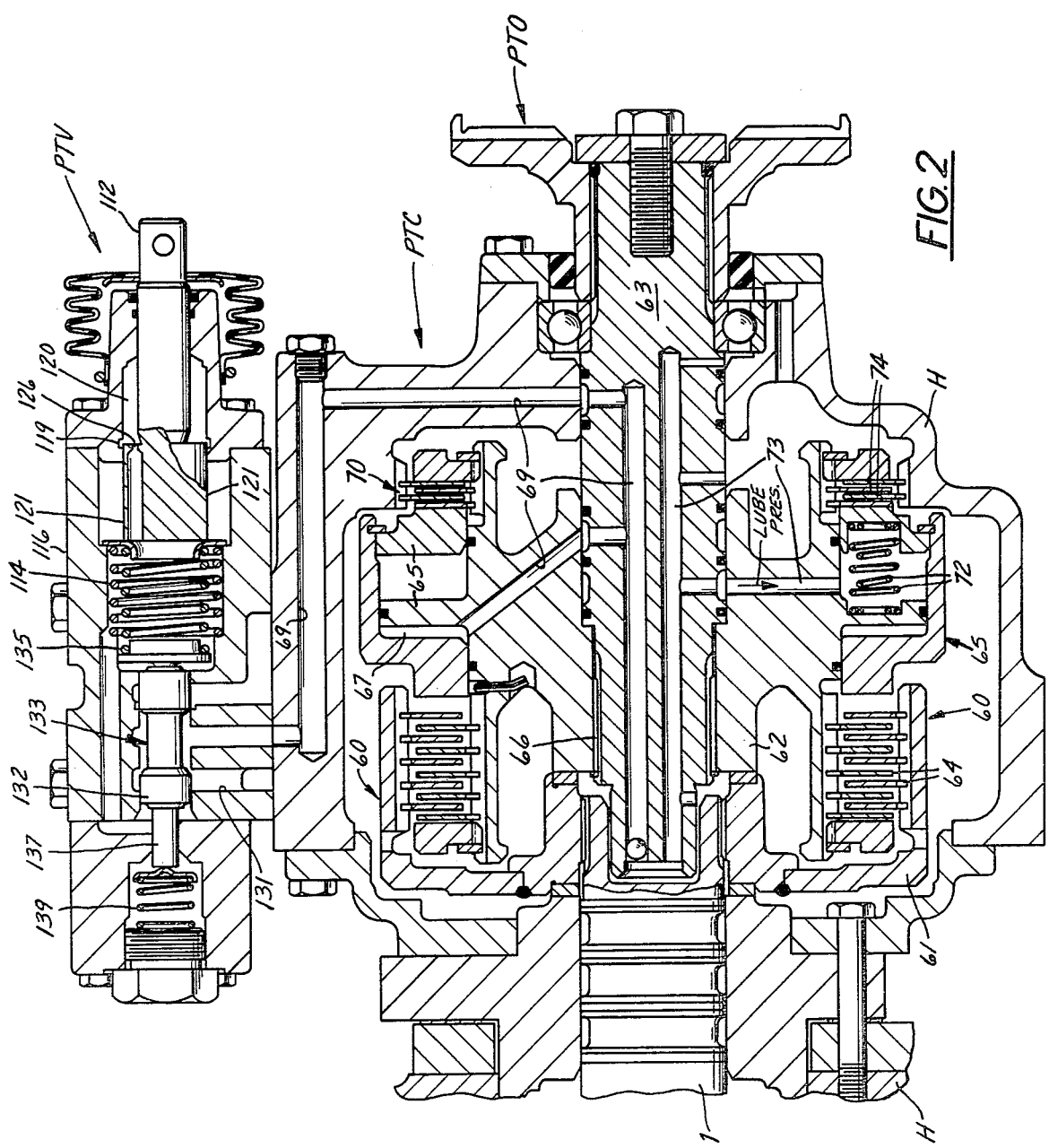
FIG. 2 is a longitudinal sectional view through the power take-off brake and valve shown in the upper right hand portion of FIG. 1, but on an enlarged scale.

The power take-off clutch PTC is mounted adjacent the end of shaft 1 and is shown in greater detail in FIG. 2. The duplex type, power take-off clutch PTC and its valve PTV includes a first friction plate clutch which is a power take-off apply clutch 60 having a hub 62 splined to the power take-off shaft 63, the inner end of which is piloted in the end of shaft 1 for rotation relative thereto. The drum 61 constitutes a first input part and the hub 62 constitutes a second output part.

Shafts 1 and 63 are driven together as a single shaft when power take-off clutch PTC is engaged when its interleaved clutch plates 64 are clamped up. The apply clutch 60 is actuated by one side of the piston 65 axially slideable on the hub 62 which in turn is fixed by splines 66 to shaft 63. The expansible fluid chamber 67 formed between the hub 62 and the piston 65 can be pressurized with actuating fluid via passage means 69 to which fluid pressure is delivered from the power take-off valve PTV.

The power take-off duplex clutch PTC has a brake 70 actuated by another side of piston 65 biased by springs 72 and lubricating fluid pressure (via passage means 73) in one direction and which biasing force serves to engage or clamp-up the interleaved friction plates 74 which are splined to the hub 62 and housing H. When brake 70 is engaged, the power take-off shaft 63 is locked to the housing and thereby brakes or stops rotation of the power take-off shaft 63. Consequently any attached machinery is stopped when the power take-off clutch 60 is disengaged, and the brake brake 70 is engaged. The power take-off clutch control valve PTV to be referred to is basically a manually variable regulator valve wherein the clutch apply pressure for the apply clutch 60 can be varied manually from zero p.s.i. to full pressure. This apply pressure acts in opposition to the aforementioned bias of the spring 72 and lubrication pressure. Gradual increase in apply pressure via the aforementioned passage 69 will move the duplex piston 65 away from engaging the brake 70, to thereby engage the driving clutch 60 which is connected to the transmission input shaft 1.

If the operator shuts down the vehicle without disconnecting the power take-off, the latter will be automatically disconnected when the brake 70 is applied by the springs when the supply pump, to be referred to, stops and pressure decays to zero.

Figure 3:
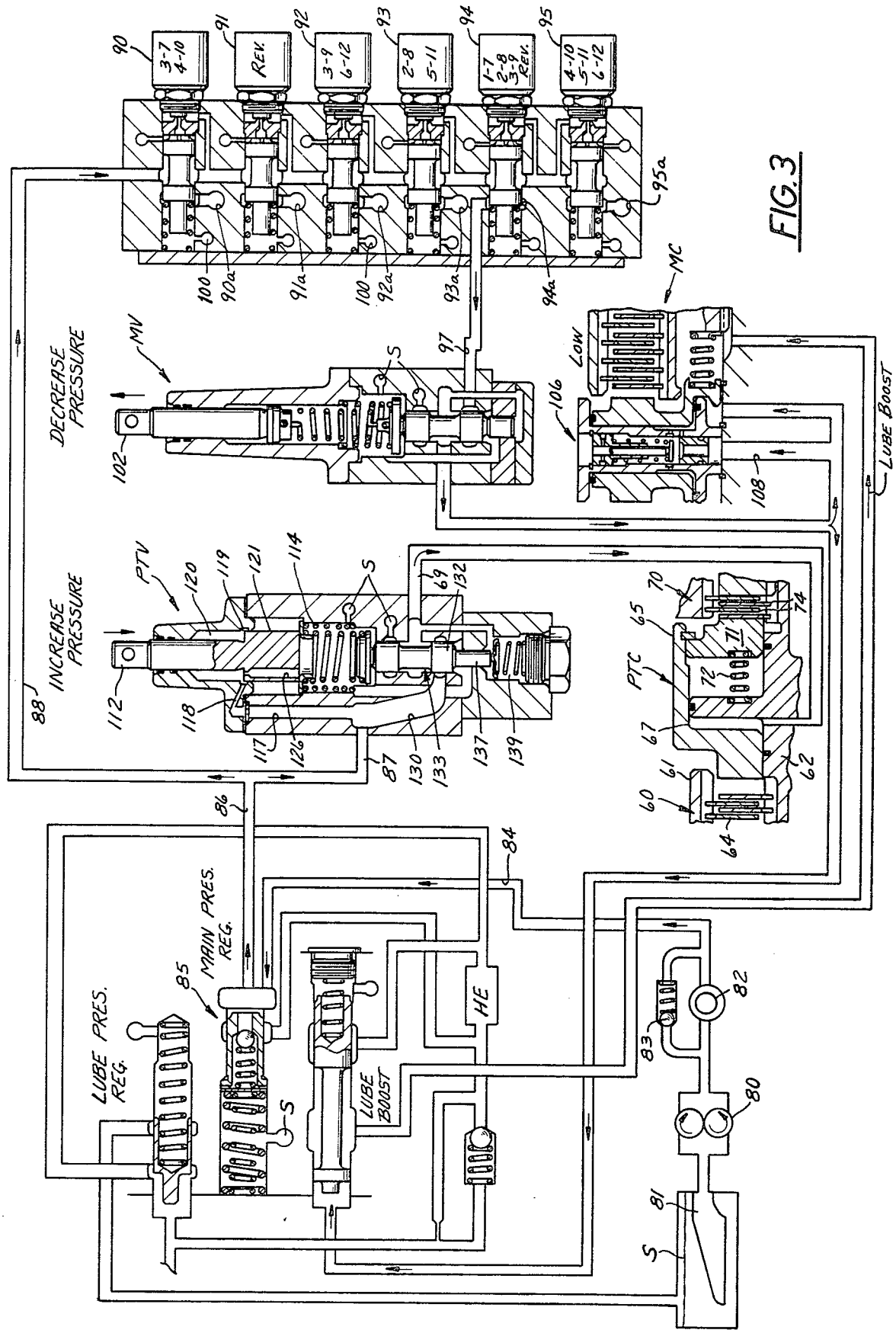
FIG. 3 is a more or less schematic hydraulic circuit of the invention.

Referring now to FIG. 3, the hydraulic circuit includes a fluid pressure supply pump 80 which draws fluid from the sump S via a sump screen 81 and delivers pressure fluid through the full flow filter 82 and/or the filter bypass valve 83, the latter of which may be set for example at 15–20 p.s.i. Pressure fluid is then delivered via conduit 84 to a conventional main pressure regulating valve 85 which in turn delivers the adjusted pressure fluid via line 86 and consequently via line 87 to the power take-off valve PTV, and via conduit 88 to the previously mentioned solenoid operated range selector valves 90, 91, 92, 93, 94 and 95. Generally similar banks of solenoids are shown in U.S. Pat. Nos. 3,805,640 of Apr. 23, 1974 to Schneider and Snoy and 3,613,480 of Oct. 19, 1971 to Shull, both of which are assigned to an assignee common with the present invention.

When an individual solenoid operated range selector valve is actuated, it delivers pressure fluid out of its respective passages 90a, 91a, 92a, 93a and 95a. Solenoid 94a delivers pressure fluid through the passage 97 and to the master clutch valve MV. The solenoid operated range selector valves are dumped to the sump via their respective passages 100 which all lead to the sump S by lines not shown.

The master clutch control valve MV is normally spring biased to the full-on position and it is necessary for the operator to pull the stem 102 outwardly in order to reduce pressure or release the master clutch. The centrifugal valve 106 of the master clutch MC receives fluid pressure from the master valve via line 108 and apply pressure delivered to the valve 106 and which pressure is below full pressure, acts only on the inner end of the valve 106. The controllable pressure acting on the inner end of the valve 106 develops sufficient torque to start the vehicle but limits the amount of heat that can be developed in slipping the clutch MC. As the apply pressure approaches the full value, the pressure is fully applied to the outer end of the clutch 106 and the clutch is locked up. As the valve 106 itself is completely described in the said U.S. patent application Ser. No. 8347, and can furthermore be of other conventional types, a further description of its structure and function is deemed to be neither necessary nor desirable for purposes of this disclosure.

With the master valve MV which controls the master clutch, the operator can control the capacity of the master clutch in the low gear ranges only.

Referring again to the power take-off valve PTV (shown in FIG. 3 in the detent locked position), the operator controls the valve by shifting its stem 112. More specifically, when the stem 112 is pushed inwardly, an increase in pressure results and the operator can thus vary the modulation of the power take-off clutch via pressure fluid which is directed through passage means 69 to the previously mentioned expansible chamber 67. A valve of this general character is shown in the U.S. Pat. No. 3,799,304 of Mar. 26, 2974 to Richmond and is assigned to an assignee common with the present invention.

The power take-off valve PTV of the present invention has a built-in hydraulic detent which will now be described in detail, particularly with reference to FIGS. 4 and 5, which are enlarged views of the power take-off valve PTV. FIG. 4 shows the valve in the detent unlocked position, i.e., in the decreased pressure position, when the stem 112 is pulled to the outer position. FIG.

5 shows the hydraulic detent in the locked position with the stem 112 locked in the inner, pressure increasing position. A more detailed reference will now be made to the operation of this power take-off valve PTV.

The power take-off valve when the stem 112 has been pulled out (FIG. 4) by the operator, is biased to that position by spring 114. Pressure fluid as previously mentioned is directed via passage 87 and into the valve body 116 through passage 117 and through a similar passage 118 to an annular groove 119 which surrounds the chamber 120. The stem includes an enlarged cylindrical land portion 121 which terminates in a shaft corner edge 122. As shown in FIG. 4, passage 118 and particularly the groove 119 is blocked by the land portion 121. At the same time pressure fluid from passage 87 enters passage 130 and annular groove 131 but is blocked by the land portion 132 of a double landed, pressure fluid supply spool 133. Spring 139 acts through pin 137 and insures that the axially slideable spool 133 is urged to the right against the bias of spring 135.

When the operator has pushed the valve stem 112 inwardly (FIG. 5), pressure fluid enters annular groove 119 thereby building up pressure in chamber 120 and holding the stem 112 in the inner, locked detent position. Orifice 126 vents chamber 120. In this condition, pressure fluid also enters annular groove 131 and flows past the corner of the land 132 of spool 133 and through openings 140 and is directed via passage 69 to the power take-off clutch. Under these circumstances, the springs act as a pressure regulator against the regulated pressure fluid entering passage 130.

In this manner, the operator can modulate the speed of the take-off shaft by controlling the pressure being admitted to the power take-off clutch by shifting the valve stem 112, pushing the valve stem 112 inwardly (FIG. 5) increases the pressure admitted to the power take-off clutch and the detent pressure locks the spool in the clutch operative position. Thus, as the operator moves the stem 112 inwardly, he is increasing the pressure to the power take-off clutch proportional to the position of the stem and disengaging the brake 70. At almost full inward travel of the stem, the large diameter of land 121 uncovers groove 119 and the back side of the stem becomes pressurized, holding the stem in the full fluid pressure position.

It is necessary for the operator to pull the stem outwardly in order to overcome the hold in detent force to thereby return the stem to the full disconnect position.

With the present invention if this valve is in the "engaged" position when the operator shuts down the machine, pressure supplied to this valve and holding it in the detent position will decrease to zero value and the valve will be returned to the "disengaged" position automatically. This safety feature insures that the engine will not be started up with the power take-off unintentially engaged.

I claim:

1. In a tractor power transmission having a change speed gear mechanism mounted in a non-rotatable housing and for propelling the tractor over the ground at different speeds, a power input shaft for said mechanism, said mechanism including a duplex clutch assembly mounted on said input shaft, said assembly including a pair of selectively engagable clutches each having a gear for transmitting power through said mechanism; a power take-off shaft journalled adjacent said input shaft and in coaxial alignment therewith, said power take-off shaft having means for connection to an implement or the like to be driven by said power take-off shaft; a duplex clutch for (1) selectively detachably connecting said shafts together or (2) disconnecting said shafts and locking said power take-off shaft to the transmission housing, a hub splined to said power take-off shaft for rotation therewith, said duplex clutch including a hydraulically actuated friction plate clutch connected to and between said power shaft and said hub for forming a driving connection between said shafts, said duplex clutch also having a brake between said housing and said hub, a piston axially slideable on said hub and defining an expansible fluid chamber therewith for actuating said friction plate clutch, said piston and hub also defining a second chamber, spring means in said second chamber, and a fluid passage in said hub and communicating with said second chamber for conducting lubricating fluid to said second chamber, whereby said spring means and said lubricating fluid act together to bias said brake to an engaged position for locking said hub and said power take-off shaft to said housing when said clutch is disconnected.

2. A transmission as set forth in claim 1 further including operator control valve means for controllably modulating said clutch, said valve means having a valve body, a pressure fluid supply spool axially slideable in said body, an operator control stem axially slideable in said body, resilient means between said control stem and said spool whereby said stem when axially shiftable by said operator modulates the pressure fluid delivered by said spool to said hydraulically actuated clutch to thereby vary the output speed of the power take-off shaft, said stem having a back side and defining with said body a detent pressure chamber, a fluid passage means for introducing pressure fluid into said body and to said spool, and second fluid passage means from said first passage means and placing the latter in communication with said chamber when said spool is pushed to a position where it causes said spool to deliver increased pressure to said hydraulic clutch, said chamber then being pressurized to act on said back side of said stem to hold the latter in hydraulic clutch actuating position thereby forming a hydraulic detent for said stem.

3. A tractor power transmission having a non-rotatable housing, a change speed gear mechanism mounted in said housing for propelling the tractor at different speeds, a power input shaft for said mechanism, said mechanism including a duplex clutch assembly mounted on said input shaft, said assembly including a pair of selectively engageable clutches each having a gear for transmitting power through said mechanism; a power take-off shaft journalled adjacent said input shaft and in coaxial alignment therewith, said power take-off shaft having means for connection to an implement or the like to be driven by said power take-off shaft; a duplex clutch for (1) selectively detachably connecting said shafts together or (2) disconnecting said shafts and locking said power take-off shaft to the transmission housing, said duplex clutch including a hydraulically actuated friction plate clutch having a second output part splined to said power take-off shaft for rotation therewith, and interleaved clutch plates between said parts, a hydraulically actuated piston slideably mounted on said second part and defining therewith an expansible fluid chamber for clamping up said plates and thereby forming a driving connection between said shafts, said duplex clutch also having a brake including interleaved friction plates between said housing and said second part of said clutch, said piston and said second part defining a second chamber for actuating said brake, spring means acting between said second part and said piston, and lubricating fluid passage means in said second part and communicating with said second chamber for conducting lubricating fluid to said second chamber to assist said spring means in biasing said brake to an engaged position by clamping up said plates of said brake for locking said power take-off shaft to said housing when the plates of said clutch are unclamped and said clutch is disconnected.

4. A transmission as set forth in claim 3 further including operator control valve means for controllably modulating said clutch, said valve means having a valve body, a pressure fluid supply spool axially slideable in said body, an operator control stem axially slideable in said body, resilient means between said control stem and said spool whereby said stem when axially shiftable by said operator modulates the pressure fluid delivered by said spool to said hydraulically actuated clutch to thereby vary the output speed of the power take-off shaft, said stem having a back side and defining with said body a detent pressure chamber, a fluid passage means for introducing pressure fluid into said body and to said spool, and second fluid passsage means from said first passage means and placing the latter in communication with said chamber when said spool is pushed to a position where it causes said spool to deliver increased pressure to said hydraulic clutch, said chamber then being pressurized to act on said back side of said stem to hold the latter in hydraulic clutch actuating position thereby forming a hydraulic detent for said stem.

5. In a tractor power transmission having a change speed gear mechanism mounted in a non-rotatable housing and for propelling the tractor over the ground at different speeds, a power input shaft for said mechanism, said mechanism including a duplex clutch assembly mounted on said input shaft, said assembly including a pair of selectively engagable clutches each having a gear for transmitting power through said mechanism; said power input shaft having a rear end, a power take-off shaft having one end journalled adjacent said rear end and in coaxial alignment therewith, another end of said power take-off shaft having means for connection to an implement or the like to be driven by said power take-off shaft; a duplex clutch for (1) selectively detachably connecting said shafts together or (2) disconnecting said shafts and locking said power take-off shaft to the transmission housing, said duplex clutch including a hydraulically actuated friction plate clutch having a first input part connected to said power shaft and having a second output part splined to said power take-off shaft for rotation therewith, said interleaved clutch plates between said parts, a hydraulically actuated piston slideably mounted on said second part for clamping up said plates and thereby forming a driving connection between said shafts, said duplex clutch also having a brake including interleaved friction plates between said housing and said second part of said clutch, said piston and said second part defining a second chamber for actuating said brake, spring means acting between said second part and said piston, and lubricating fluid passage means in said second part and communicating with said second chamber for conducting lubricating fluid to said second chamber, to assist said spring means in biasing said brake to an engaged position by clamping up said plates of said brake for locking said power take-off shaft to said housing when the plates of said clutch are unclamped and said clutch is disconnected, and operator control valve means for operating said piston to cause said clamp-up of the plates of said clutch.

6. A transmission as set forth in claim 5 further characterized in that said operator control valve means includes a valve housing, a pressure fluid supply spool axially slideable in said housing, an operator control stem axially slideable in said housing, resilient means between said control stem and said spool whereby said stem when axially shiftable by said operator modulates the pressure fluid delivered by said spool to said hydraulically actuated clutch to thereby vary the output speed of the power take-off shaft, said stem having a back side and defining with said housing a detent pressure chamber, a fluid passage means for introducing pressure fluid into said housing and to said spool, second fluid passage means from said first passage means and placing the latter in communication with said chamber when said spool is pushed to a position where it causes said spool to deliver increased pressure to said hydraulic clutch, said chamber then being pressurized to act on said back side of said stem to hold the latter in hydraulic clutch actuating position thereby forming a hydraulic detent for said stem.

* * * * *